US012511181B2

United States Patent
Kobayashi et al.

(10) Patent No.: US 12,511,181 B2
(45) Date of Patent: Dec. 30, 2025

(54) RECOMMENDATION SYSTEM, CONFIGURATION METHOD THEREFOR, AND RECOMMENDATION METHOD

(71) Applicant: Hitachi, Ltd., Tokyo (JP)

(72) Inventors: Yuki Kobayashi, Tokyo (JP); Yutaro Nakamura, Tokyo (JP); Jumpei Honda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 756 days.

(21) Appl. No.: 17/760,553

(22) PCT Filed: Jul. 27, 2020

(86) PCT No.: PCT/JP2020/028666
§ 371 (c)(1),
(2) Date: Mar. 15, 2022

(87) PCT Pub. No.: WO2021/152883
PCT Pub. Date: Aug. 5, 2021

(65) Prior Publication Data
US 2022/0342743 A1    Oct. 27, 2022

(30) Foreign Application Priority Data
Jan. 31, 2020  (JP) ................................ 2020-014749

(51) Int. Cl.
*G06F 11/07*     (2006.01)
*G06F 16/334*   (2025.01)
*G06Q 10/20*    (2023.01)

(52) U.S. Cl.
CPC ...... *G06F 11/0769* (2013.01); *G06F 11/0793* (2013.01); *G06F 16/3344* (2019.01); *G06Q 10/20* (2013.01)

(58) Field of Classification Search
CPC ............................ G06F 16/3344; G06Q 10/20
See application file for complete search history.

(56) References Cited

U.S. PATENT DOCUMENTS 9,672,497 B1 *   6/2017  Lewis ................... G06F 40/284
10,929,392 B1 *  2/2021  Cheng ...................... G06N 3/08
(Continued)

FOREIGN PATENT DOCUMENTS

JP    2017-146745 A    8/2017
JP    2019-018979 A    2/2019
(Continued)

OTHER PUBLICATIONS

International Search Report of PCT/JP2020/028666 dated Sep. 15, 2020.

*Primary Examiner* — Alicia M Willoughby
(74) *Attorney, Agent, or Firm* — MATTINGLY & MALUR, PC

(57) ABSTRACT

A problem to be addressed by the present invention is to rapidly extract information that satisfies a user, with respect to an inference result of an inference model. A preferred aspect of the present invention is a recommendation system comprising: an inference network that has an inference model, an input unit that inputs inference model inquiries, an output unit that outputs inference model replies, and input nodes and output nodes, the inference network using links to implement inference stages; and a network search unit that searches for the output nodes of the inference network on the basis of the inference model replies.

5 Claims, 19 Drawing Sheets

(56) References Cited

U.S. PATENT DOCUMENTS

| | | | |
|---|---|---|---|
| 2018/0136616 A1* | 5/2018 | Takami | G06Q 10/20 |
| 2020/0034738 A1 | 1/2020 | Egi et al. | |
| 2020/0234157 A1 | 7/2020 | Kagawa et al. | |
| 2020/0258057 A1* | 8/2020 | Farahat | G06Q 10/20 |
| 2022/0342743 A1* | 10/2022 | Kobayashi | G06F 16/90 |
| 2022/0382858 A1* | 12/2022 | Ellam | G06Q 10/20 |

FOREIGN PATENT DOCUMENTS

| | | |
|---|---|---|
| JP | 2019-159613 A | 9/2019 |
| JP | 2020-017197 A | 1/2020 |
| WO | 2019/070010 A1 | 4/2019 |
| WO | WO 2019/070290 A1 * 4/2019 | ............ G01M 15/10 |

* cited by examiner

Fig. 5

| No. | INQUIRY CONTENT 401 | CONFIRMATION CONTENT 402 | CAUSE 403 | REPAIR CONTENT 404 |
|---|---|---|---|---|
| 01 | TODAY, WHEN TURNING ON, DISPLAY DIDN'T SHOW ANYTHING. | WHEN TURNING ON, IT IS CONFIRMED THAT LOGIN SCREEN IS REACHED. AFTER LOGGING IN, DISPLAY GOES BLACK AFTER A WHILE AND NOTHING IS DISPLAYED. ... | IT IS KNOWN THAT CAUSE LIES IN SETTING OF DISPLAY OUTPUT. | CHANGE DISPLAY OUTPUT DESTINATION TO DISPLAY OF LAPTOP COMPUTER AND PERFORM REBOOT. |
| 02 | WHEN SETTING TO CHANGE DISPLAY OUTPUT DESTINATION IS PERFORMED, SIZE OF DISPLAYED SCREEN IS TO BE CHANGED, BUT SIZE CANNOT BE RESTORED. | ... | ... | ... |
| 03 | ... | | | |

| No. 601 | QUESTION 602 | LABEL 603 |
|---|---|---|
| 01 | TODAY, WHEN TURNING ON, DISPLAY DIDN'T SHOW ANYTHING WHEN TURNING ON, IT IS CONFIRMED THAT LOGIN SCREEN IS REACHED. | PORTION OF REPAIR: DISPLAY OUTPUT DESTINATION REPAIR METHOD: CHANGE OF OUTPUT DESTINATION |
| ... | ... | ... |
| 02 | ... | ... |
| 03 | ... | ... |

Fig. 6B

| No. | QUESTION | LABEL |
|---|---|---|
| 01 | TODAY, WHEN TURNING ON, DISPLAY DIDN'T SHOW ANYTHING. | CAUSE OF REPAIR: SETTING OF DISPLAY OUTPUT |
| 02 | ... | ... |
| 03 | ... | ... |

| No. | QUESTION | LABEL |
|---|---|---|
| 01 | TODAY, WHEN TURNING ON, DISPLAY DIDN'T SHOW ANYTHING. | PORTION OF REPAIR: DISPLAY OUTPUT DESTINATION REPAIR METHOD: CHANGE OF OUTPUT DESTINATION |
| 02 | ... | ... |
| 03 | ... | ... |

601   602   603

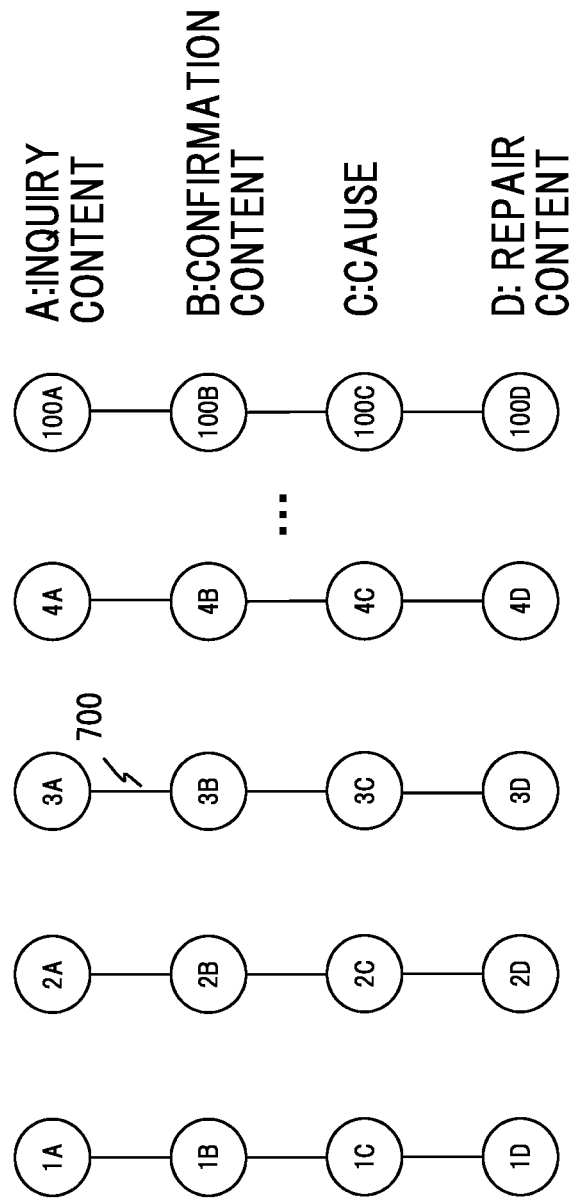

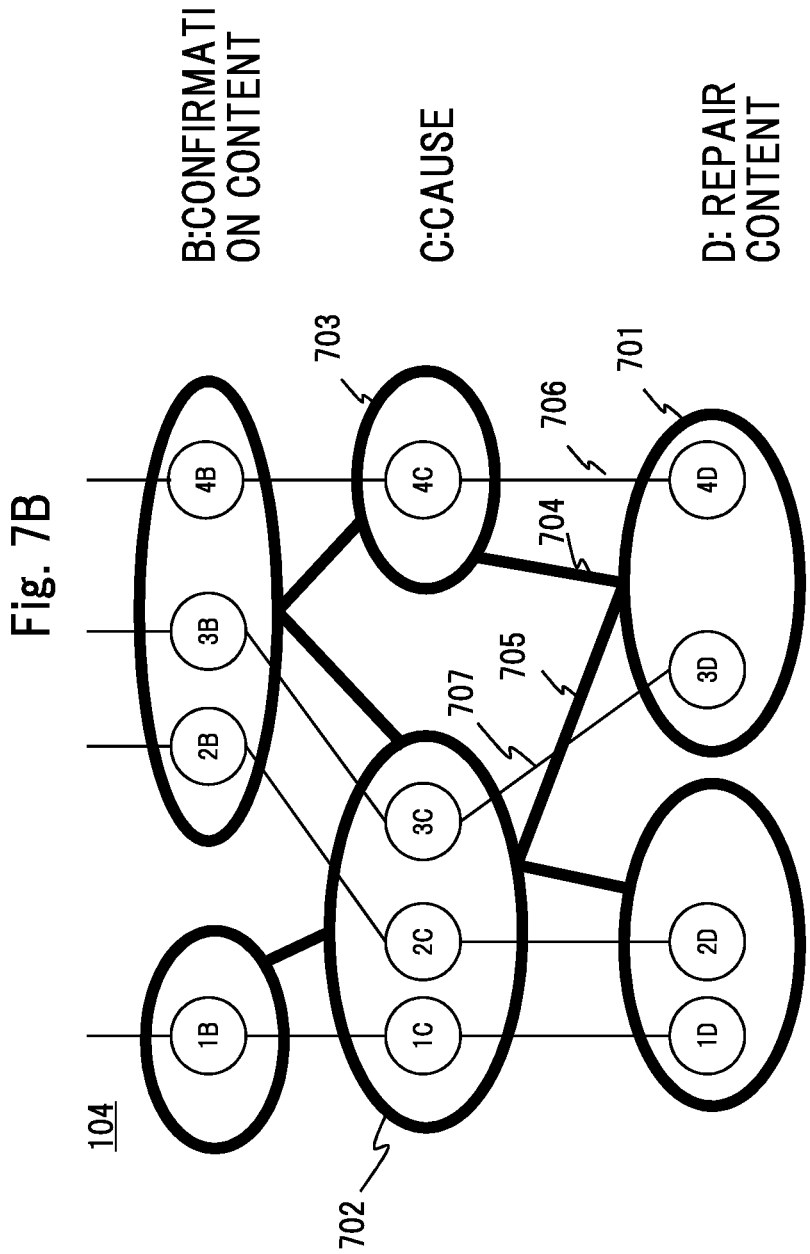

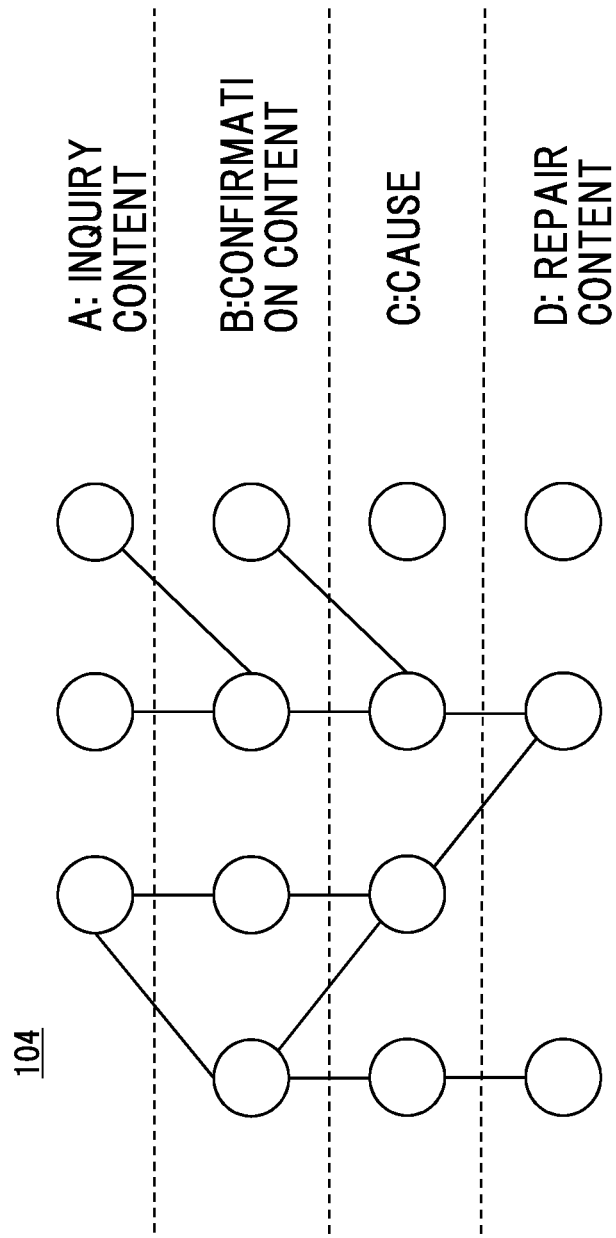

| GROUP ID / 901 | REPORT NO / 902 | LINK DESTINATION GROUP ID / 903 | REPRESENTATIVE TEXT / 904 |
|---|---|---|---|
| INQUIRY CONTENT GROUP 1 | 1, 12, 20 | CONFIRMATION CONTENT GROUP 5<br>CONFIRMATION CONTENT GROUP 7 | TODAY, WHEN TURNING ON, DISPLAY DIDN'T SHOW ANYTHING. |
| INQUIRY CONTENT GROUP 2 | 2, 3, 4 | CONFIRMATION CONTENT GROUP 6 | ... |
| ... | | | |
| REPAIR CONTENT GROUP 10 | 2, 6, 8 | CAUSE GROUP 1 | ... |
| REPAIR CONTENT GROUP 11 | 10, 22 | CAUSE GROUP 15<br>CAUSE GROUP 17 | CHANGE DISPLAY OUTPUT DESTINATION TO DISPLAY OF LAPTOP COMPUTER AND PERFORM REBOOT. |

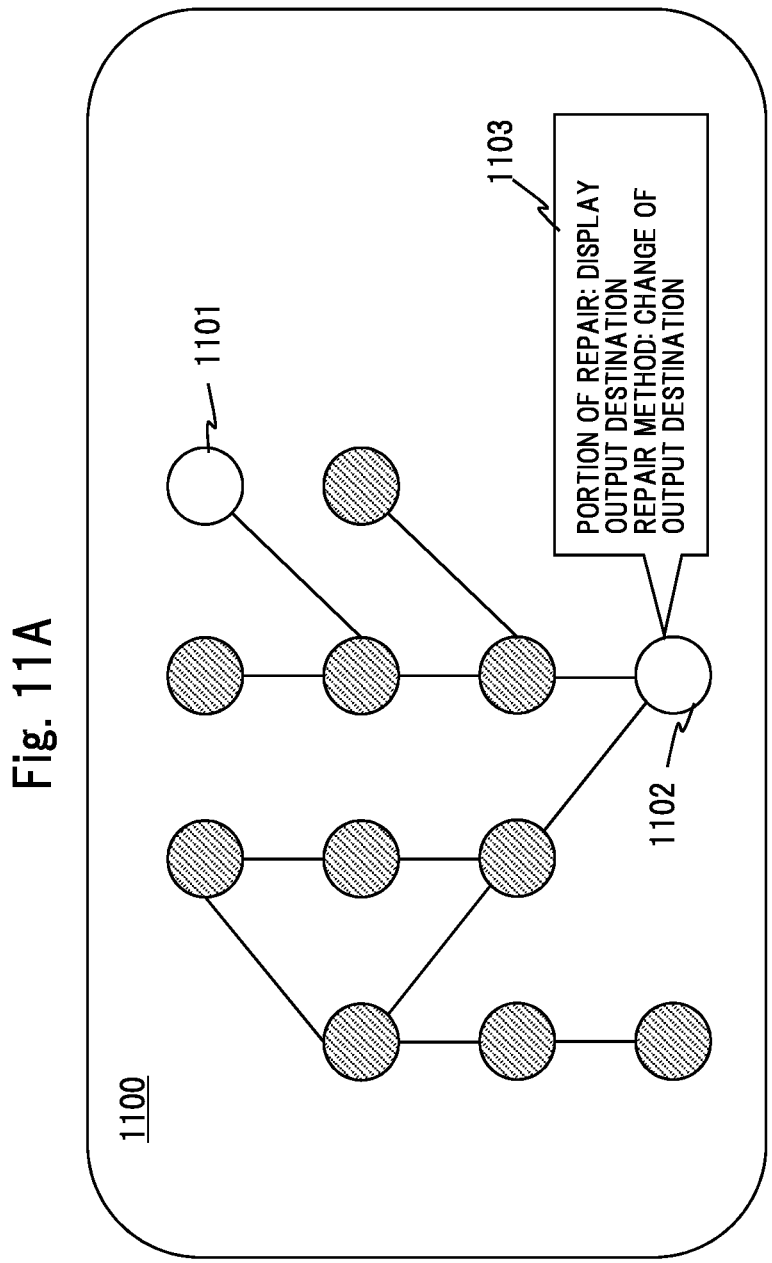

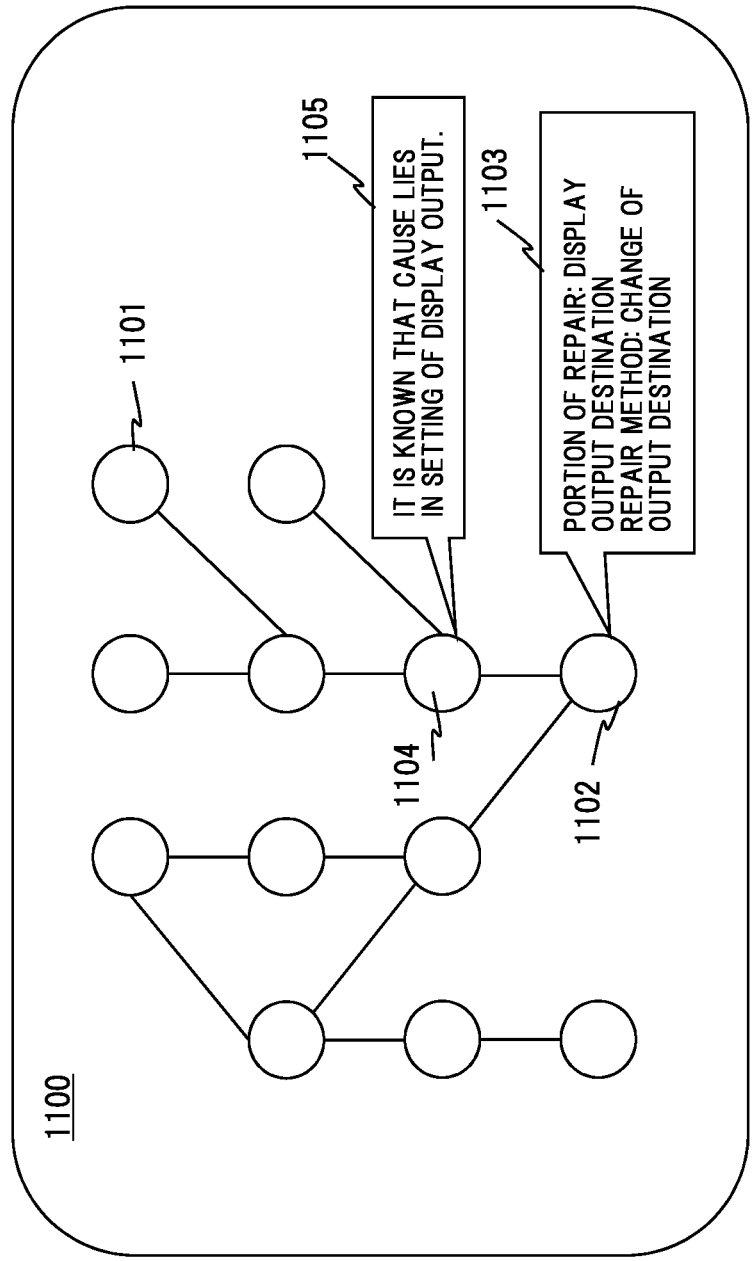

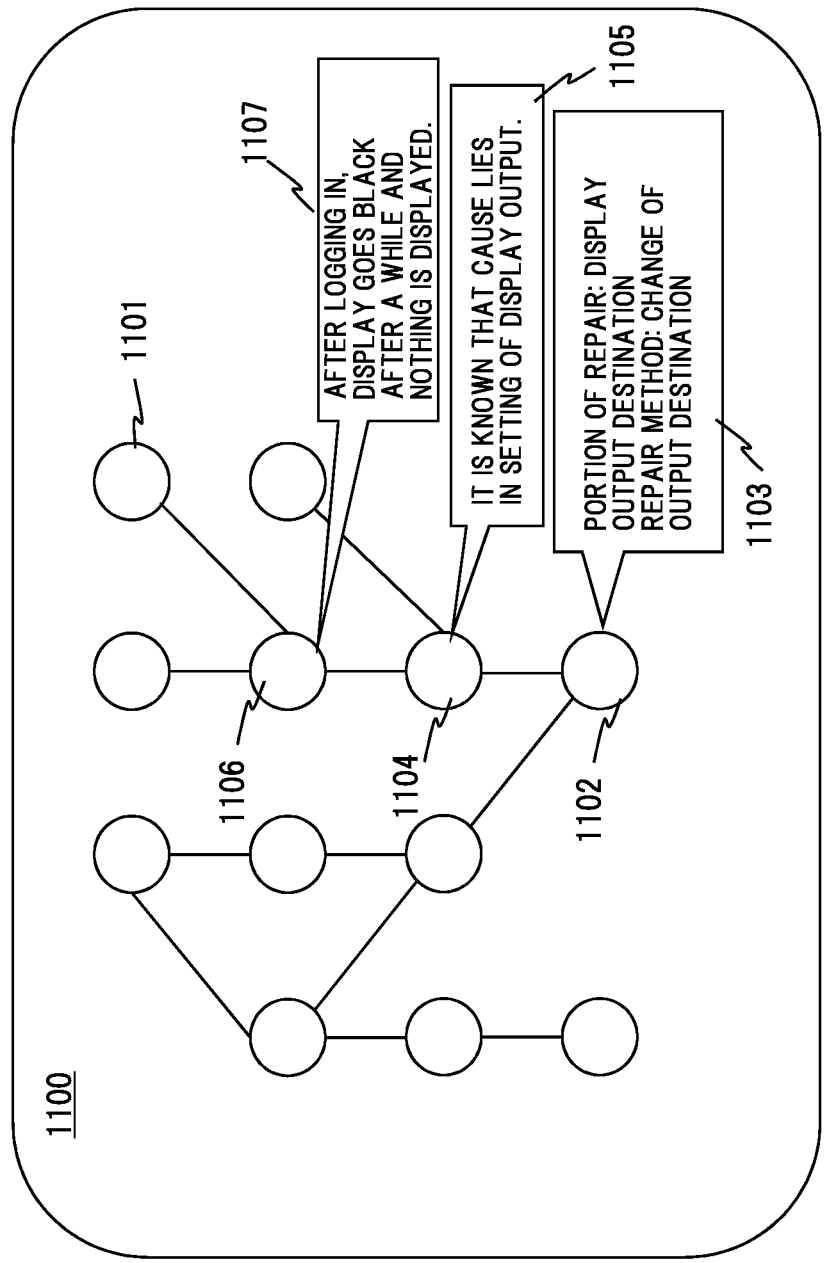

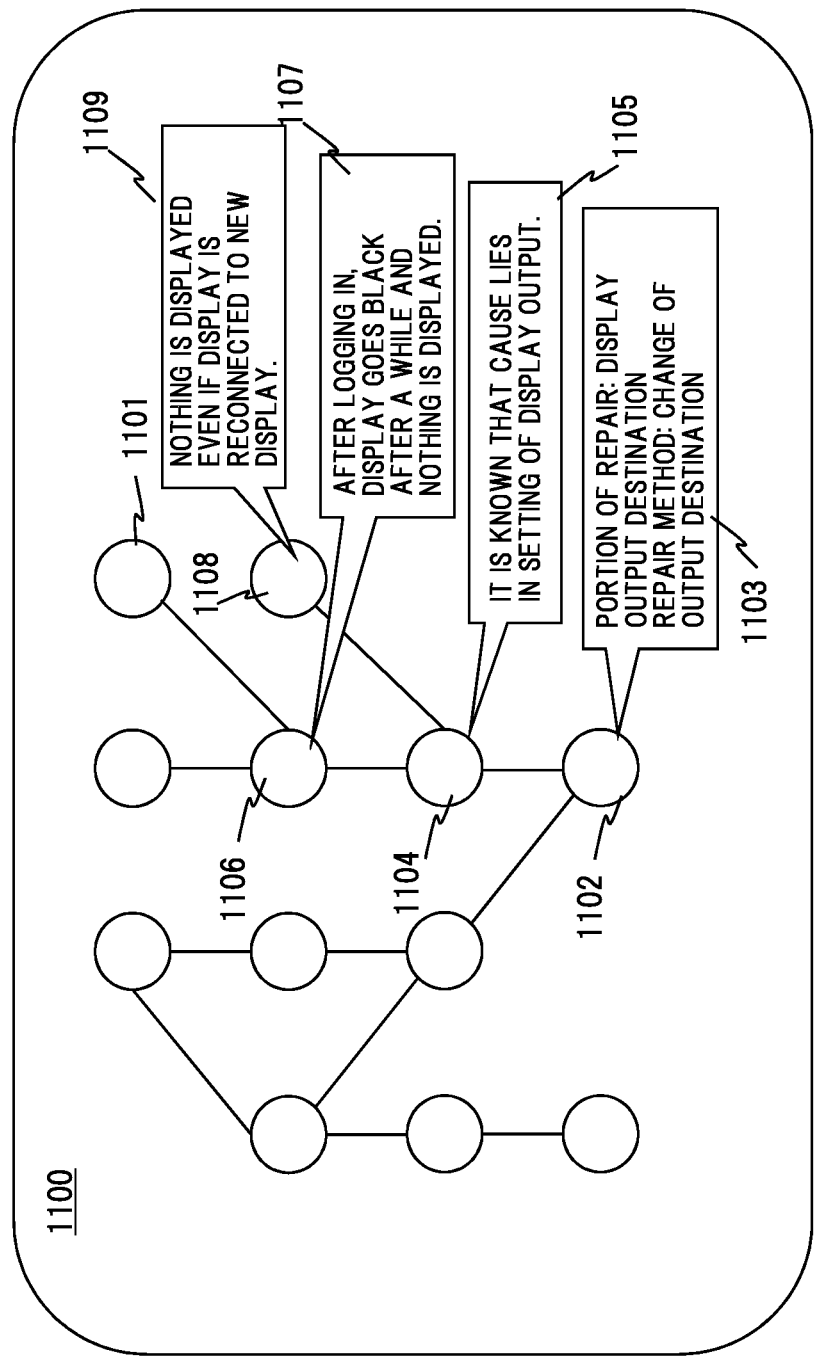

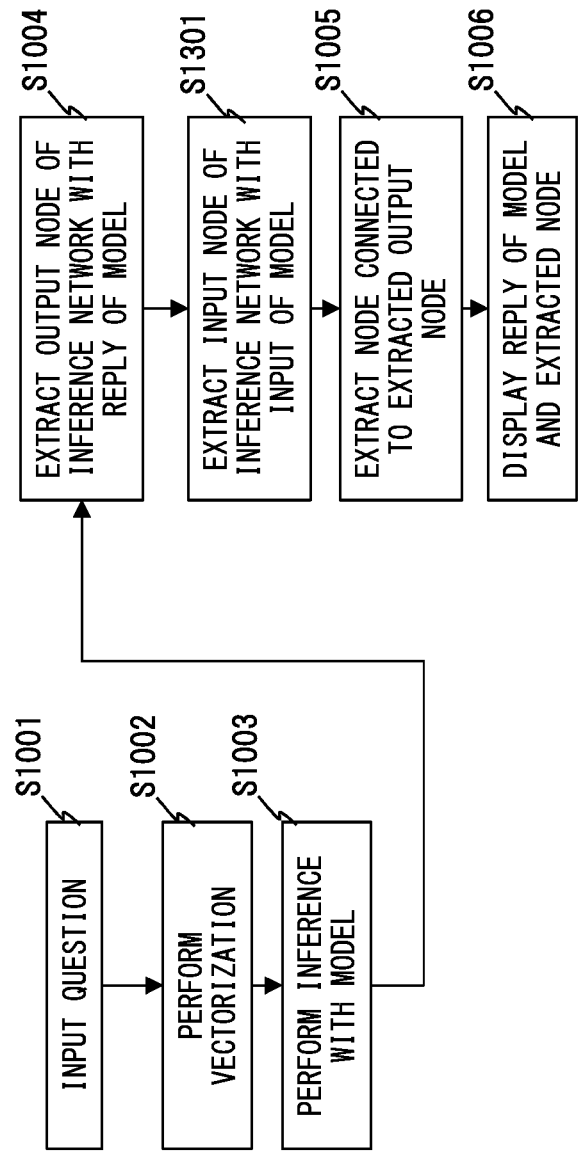

RECOMMENDATION SYSTEM, CONFIGURATION METHOD THEREFOR, AND RECOMMENDATION METHOD

TECHNICAL FIELD

The present invention relates to a technique for inferring from a problem by using an inference model and offering measures against the problem.

BACKGROUND ART

In the modern society where Internet of Things (IoT) is spreading, attention has been drawn to the development of IoT solutions related to maintenance work. In addition, solutions offering measures against problems by inference using artificial intelligence (AI) have been put into practical use. As AI, for example, an inference model (learning model) to which a deep neural network (DNN) or the like is applied is used. Functionally, an inference model is a type of a function approximator.

Herein, repair recommendation which is an example of the IoT solution will be described. In the repair recommendation, the inference model is configured to derive correlation and relationship of a specific event from a failure/repair history of a target device, which is past information. In order to configure the inference model, the techniques of machine learning and statistical methods (hereinafter, referred to as "machine learning or the like") are utilized. In such an application, for example, when a user (such as a repair staff) inputs information on a failure state of an equipment apparatus into a terminal device and uses the inference model, the inference model proposes a repair location and a repair method.

Patent Document 1 discloses an elevator system including: an elevator controller; an operation history storage unit storing a series of operation histories in which a maintenance person operates a maintenance terminal; a defect information analysis unit analyzing defect information and outputting an analysis result; a learning processing unit outputting a learning result in which an operation history and an analysis result are used as teacher data; and an inference unit inferring an appropriate work procedure corresponding to new defect information based on the learning result.

CITATION LIST

Patent Document

Patent Document 1: JP 2019-018979 A

SUMMARY OF THE INVENTION

Problems to be Solved by the Invention

Black-boxing of the inference model algorithm is accelerating due to the progress of technological development aimed at improving the prediction accuracy of AI. For this reason, it is difficult for a user using the inference model to objectively evaluate the validity of prediction and determination of the inference model.

In the repair recommendations in the related art, the inference model provides a prediction result, but the inference model alone provides insufficient ground for the repair staff to take the next action. In other words, it is important for the repair staff to have a sense of conviction, with respect to the output of the inference model, from the viewpoint of "is the result reliable" and "is the result really fixed if implemented" to facilitate to make a decision for repair.

In order to provide a sense of conviction to a repair staff, showing accuracy for each output is one of the measures. When there is one output with very high accuracy, it is necessary for the repair staff to consider only the one output, and when there are two outputs with high accuracy, it is necessary for the repair staff to consider only the two outputs, so that a prospect of the repair work stands.

However, on the other hand, with respect to "is the accuracy really reliable?", if there are some repair staffs convinced of the calculation result based on the past repair history, there are also repair staffs not convinced of the result. It can be stated that another form of following-up is necessary for the repair staff who cannot be provided with a sense of conviction from only the numerical values.

The inference model is generated by machine learning using past repair history, but does not present a basis for "why this repair needs to be performed". There is a possibility that the repair staff can obtain the basis for the repair by referring to the past work report by himself. However, even if a basis providing a high sense of conviction is written in one of the work reports, it is difficult for the repair staff to find the work report that is not associated with the output by himself within a limited repair time.

The method for searching for past work reports may also be considered in order to obtain the basis for repair, but it is not clear how to search for, or the actual state of description is not desired for the work reports cited by the searching, and there is a risk that the time to make a decision of the repair staff will be unnecessarily extended.

Therefore, an object of the present invention is to quickly extract a work report containing information for a work person to obtain a sense of conviction from an inference result of an inference model, in other words, information truly necessary for the work person.

Solutions to Problems

According to a preferred aspect of the present invention, there is provided a recommendation system including: an inference model; an input unit inputting a question of the inference model; an output unit outputting a reply of the inference model; an inference network having an input node and an output node and expressing an inference stage with a link; and a network search unit searching for the output node of the inference network based on the reply of the inference model.

According to another preferred aspect of the present invention, there is provided a method for configuring a recommendation system, including: a case database generation process of preparing a case database containing a plurality of reports configured with itemized texts; a label attachment process of attaching a label corresponding to each of the reports; a teacher database generation process of generating a teacher data set and generating a teacher database by using at least a portion of the itemized text as a question and the label as a reply; a model learning process of learning an inference model by using the teacher data set; a grouping process of generating a group by grouping texts of a plurality of reports based on a degree of similarity for each item of the report; a networking process of generating an inference network by forming a link between the groups; and an implementation process of implementing the inference model and the inference network.

According to still another preferred aspect of the present invention, there is provided a recommendation method, executing an inference process of performing inference with an implemented inference model to obtain a reply; and an output node extraction process of extracting an output node of the implemented inference network based on a reply.

Effects of the Invention

It is possible to quickly extract information truly necessary for a work person from an inference result of an inference model.

BRIEF DESCRIPTION OF THE DRAWINGS

FIG. 5 is a table diagram illustrating an example of a data configuration of case DB.

FIG. 6A is a table diagram illustrating an example of a data configuration of teacher DB.

FIG. 6B is a table diagram illustrating an example of another data configuration of the teacher DB.

FIG. 6C is a table diagram illustrating an example of still another data configuration of the teacher DB.

FIG. 7A is a conceptual diagram in which nodes of items of a report are connected by links.

FIG. 7B is a conceptual diagram for grouping nodes of items of a report and links.

FIG. 8 is a conceptual diagram of an inference network.

FIG. 9 is a table diagram illustrating an example of network data defining a configuration of the inference network.

FIG. 11A is an image diagram illustrating an example of replies and extracted nodes of an inference model to be displayed.

FIG. 11B is an image diagram illustrating an example of replies and extracted nodes of an inference model to be displayed.

FIG. 11C is an image diagram illustrating an example of replies and extracted nodes of an inference model to be displayed.

FIG. 11D is an image diagram illustrating an example of replies and extracted nodes of an inference model to be displayed.

FIG. 13 is a flowchart illustrating a flow of a repair recommendation process according to a third embodiment.

MODE FOR CARRYING OUT THE INVENTION

Figure 1:
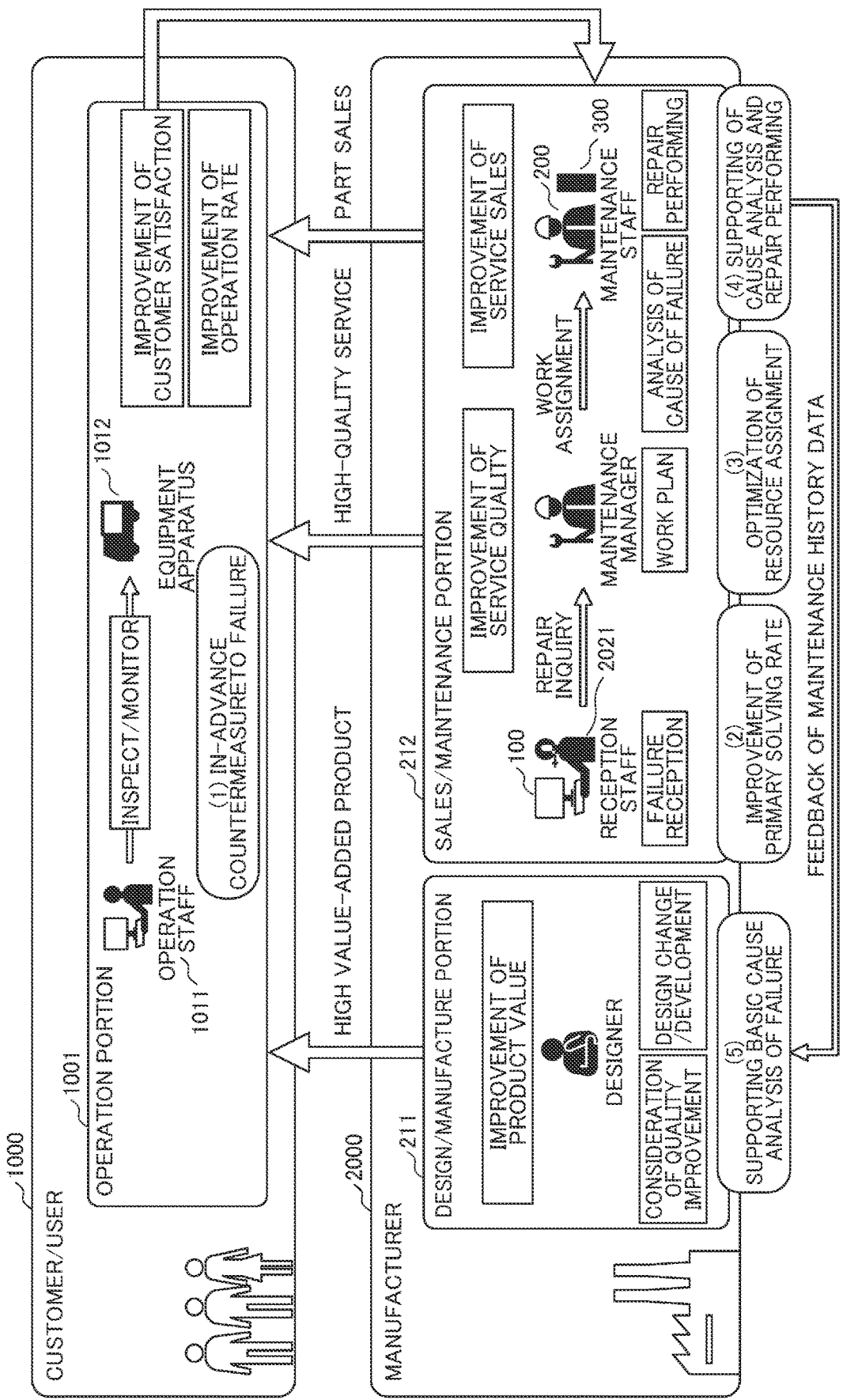
FIG. 1 is a conceptual diagram illustrating an overall image of repair recommendation.

Hereinafter, embodiments will be described in detail with reference to the drawings. However, the present invention is not limited to the description of the embodiments illustrated below. It is easily understood by those skilled in the art that a specific configuration of the present invention can be changed without departing from the spirit or idea of the present invention.

In the configuration of the invention described below, the same reference numerals may be used in common among different drawings for the same component or the components having similar functions, and duplicate description thereof may be omitted.

When there is a plurality of elements having the same or similar functions, the elements may be described by attaching different subscripts to the same reference numerals. However, when it is not necessary to distinguish between the plurality of elements, the subscripts may be omitted in description.

In the present specification, notations such as "first", "second", and "third" are denoted to identify components, and do not necessarily limit the numbers, orders, or contents thereof. Further, the reference numerals for identifying the components are used for each context, and the reference numerals used in one context do not always indicate the same configurations in another context. Further, it does not prevent the component identified by a certain reference numeral from functioning as the component identified by another reference numeral.

In some cases, the location, size, shape, range, or the like of each component illustrated in the drawings and the like may not denote the actual location, size, shape, range, or the like in order to facilitate understanding of the invention. For this reason, the present invention is not necessarily limited to the positions, sizes, shapes, ranges, or the like disclosed in the drawings and the like.

The publications, patents and patent applications cited in this specification constitute a portion of the description of the specification, as they are.

First Embodiment

<1. Overall Image of Recommendation System>

FIG. 1 is a conceptual diagram illustrating a background using a repair recommendation system of an embodiment. In an operation portion 1001 of a customer/user 1000, when an operation staff 1011 inspects and monitors an equipment apparatus 1012, inputs information on a situation thereof into a terminal device, and requests to a sales/maintenance portion 212 of a manufacturer 2000, the sales/maintenance portion 212 provides necessary services and parts to the customer/user 1000. In addition, maintenance history data is fed back to a design/manufacturing portion 211, and is reflected in examination of quality improvement, change of design, and the like.

In the sales/maintenance portion 212, a reception staff 2021 receives a request from the customer/user 1000 and performs repair inquiry to a maintenance manager. The maintenance manager generates a work plan and assigns a work to a maintenance staff (hereinafter sometimes referred to as a "user") 200. The user 200 performs analysis of a cause of failure and performs actual repair.

For example, upon receiving an alarm issued by a device or a notification from an operation staff 1011, a work person, and the like on a site where the device is located, the user 200 rushes to the site where the target equipment apparatus 1012 is located and grasps an event of the target device. After that, the user 200 inputs information (phenomenon comment or the like) describing the event of the target device to the terminal device 300. It is noted that the user 200 may have information about the event of the device in advance by some method. In addition, the input information to the terminal device 300 may include comments from the operation staff 1011, the work person, and the like on the site. As the terminal device 300, a portable device such as a tablet terminal may be used.

The reception staff 2021 of the sales/maintenance portion 212 of the manufacturer 2000 receives a report from the operation staff 1011 of the customer/user 1000. Alternatively, information from the maintenance staff 200 of the sales/maintenance portion 212 is received. At this time, when the reception staff 2021 can solve the problem, the burden on the maintenance manager and the maintenance staff can be reduced. Further, when the information for solving the problem can be obtained at the stage of the failure reception of the reception staff 2021, the work efficiency in the post-process will be improved. Therefore, it can be stated that improvement of a primary solving rate is an important issue. As a system for this reason, utilization of the repair recommendation system is effective.

A repair recommendation system 100 outputs recommend information (referred to as "proposal") about a countermeasure (repair) for the input information based on the input information such as the phenomenon comment input by the user 200. The repair also includes adjustment and maintenance of the device. Then, the repair recommendation system 100 transmits the recommend information to the terminal device 300 of the user 200 via the network and the like, and the recommend information is displayed on the terminal device 300. The user 200 determines the countermeasure (repair) to be performed by referring to the recommend information displayed on the terminal device 300.

The repair recommendation system 100 is configured with an information processing device (computer) such as an application server. The terminal device 300 is configured with an information processing device such as a portable information communication terminal. The repair recommendation system 100 and the terminal device 300 are connected to each other by a wired or wireless network. However, there is no problem even if the repair recommendation system 100 and the terminal device 300 are integrally configured.

<2. Configuration of Recommendation System>

Figure 2:
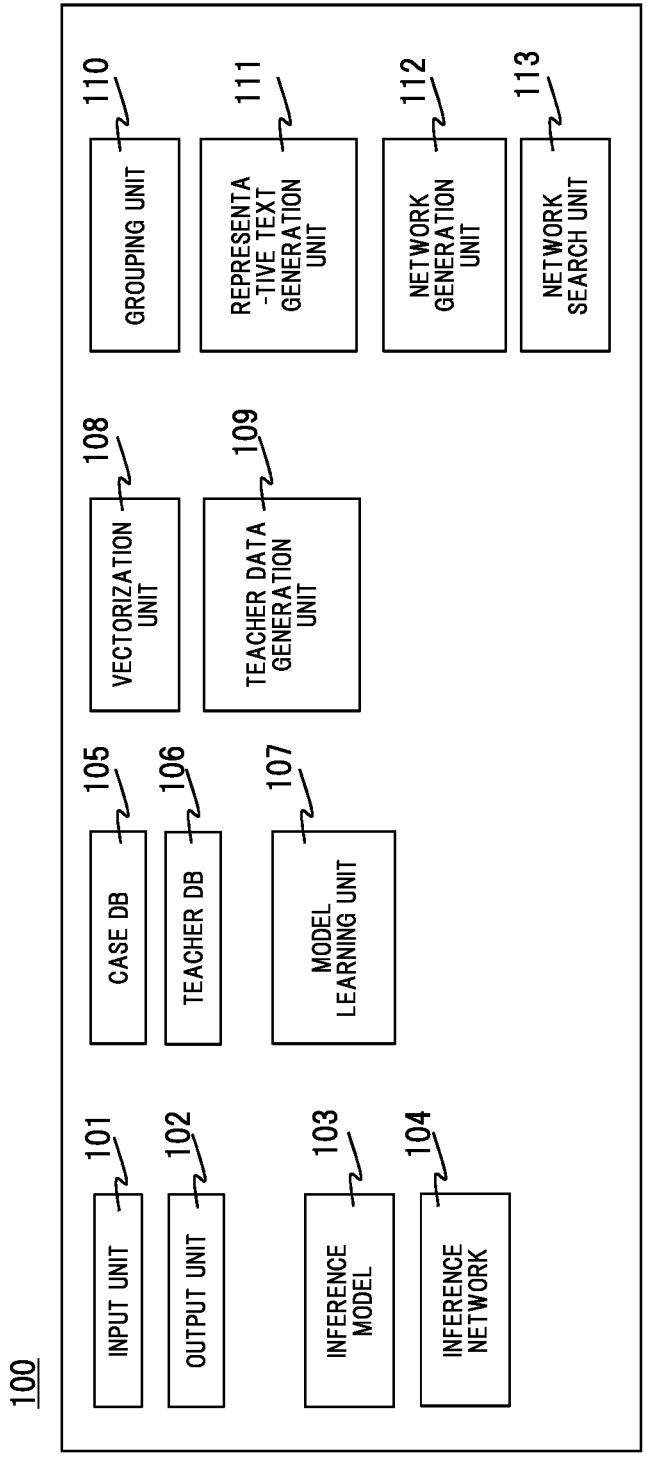
FIG. 2 is a block diagram illustrating a configuration example of a repair recommendation system.

FIG. 2 is a block diagram illustrating a configuration example of the repair recommendation system 100. As described above, the repair recommendation system 100 is a computer, and is generally provided with an input device (keyboard, pointing device, or the like), an output device (printer, display, or the like), a processing device, and a storage device (magnetic disk device, semiconductor memory, or the like) as a computer.

In the embodiment, functions such as calculation and control are realized by the processing device executing a program stored in the storage device, and determined processing is realized in cooperation with other hardware. In some cases, the program executed by the processing device, the function thereof, or the means for realizing the function may be referred to as "function", "unit", "portion", or the like. In FIG. 2, the configuration naturally provided by the computer is omitted, and the functional configuration such as calculation, control, and database is mainly illustrated. In addition, there is a bus that connects the components and exchanges information, but the bus is not illustrated.

The repair recommendation system 100 includes an input unit 101 and an output unit 102.

The input unit 101 includes an interface function of inputting data from the outside of the terminal device 300 and the like, if necessary, in addition to a keyboard, a mouse, and the like. The input unit 101 can receive a request from the user 200 via, for example, the terminal device 300.

The output unit 102 includes an interface function of outputting data to the outside such as the terminal device 300, if necessary, in addition to a display and a printer and the like. The output unit 102 may transmit a proposal to the user 200 via, for example, the terminal device 300.

An inference model 103 is configured with, for example, a learned DNN, receives a request (question) from the user 200, performs an inference, and outputs a proposal (reply). The repair recommendation system 100 also includes an inference network 104. The inference network 104 will be described in detail later.

The repair recommendation system 100 includes a case database (DB) 105 and a teacher DB 106 in a storage device such as a magnetic disk device. In addition, the repair recommendation system 100 includes a model learning unit 107, a vectorization unit 108, a teacher data generation unit 109, a grouping unit 110, a representative text generation unit 111, a network generation unit 112, and a network search unit 113, which are realized by the processing device executing software.

In the case DB 105, for example, cases having past reports and the like as contents are stored. The teacher data generation unit 109 generates teacher data based on the data of the case DB 105. The teacher data is stored in the teacher DB 106.

The model learning unit 107 performs learning of the inference model 103 using the teacher data of the teacher DB 106. The vectorization unit 108 performs the text vectorization at the time of inputting text data to the inference model 103. There are various known techniques for the text vectorization.

The grouping unit 110 groups the contents of the texts such as past reports of the case DB 105. The representative text generation unit 111 generates the representative text for the grouped texts. The network generation unit 112 generates the inference network 104 based on the grouped text. The network search unit 113 searches for the inference network 104 based on a reply of the inference model 103.

The above configuration may be configured by a single computer, or any portion may be connected by a network or may be configured by another offline computer.

For example, the inference model 103 and the inference network 104 may be generated by another offline computer, and the generated inference model 103 and the generated inference network 104 may be implemented in the repair recommendation system 100. In that case, the repair recommendation system 100 can be configured only with the input unit 101, the output unit 102, the inference model 103, the inference network 104, the vectorization unit 108, and the network search unit 113. In this case as well, the repair recommendation system 100 may be configured with a plurality of computers connected to each other via a network.

In the embodiment, the same function as the function configured by software can be realized by hardware such as a field programmable gate array (FPGA) and an application specific integrated circuit (ASIC). Such aspects are also included in the scope of the present invention.

<3. Generation and Implementation of Inference Model and Inference Network>

Figure 3:
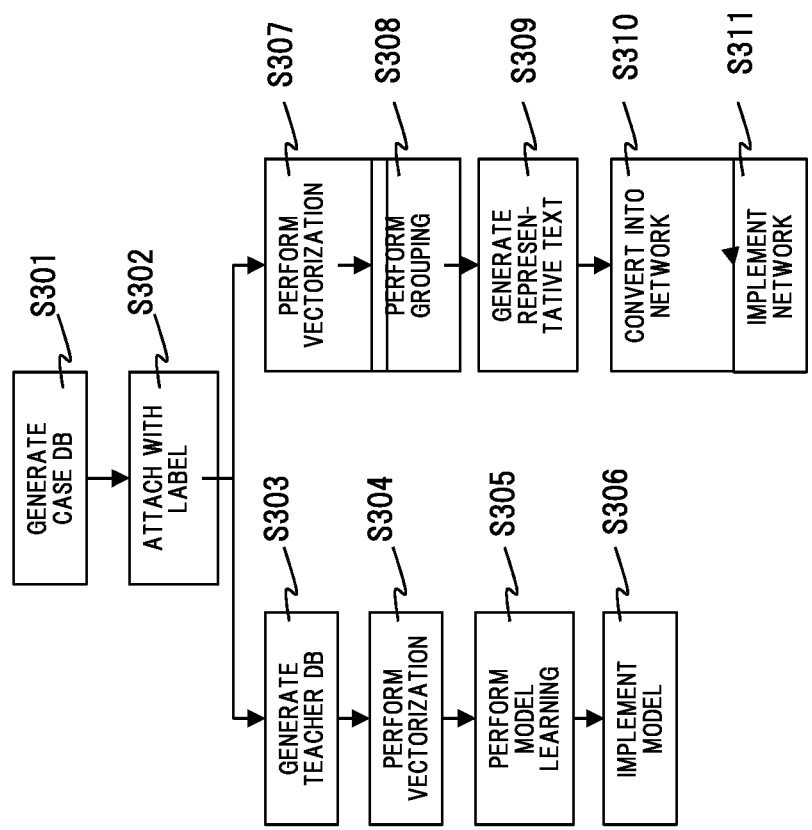
FIG. 3 is a flowchart illustrating a process of generating and implementing an inference model and an inference network.

FIG. 3 is a diagram illustrating the flow of processing of the inference model 103 and the inference network 104 from generation to implementation.

In the process S301, the case DB 105 is prepared. In the case DB 105, for example, the cases using the past reports and the like as contents are stored.

Figure 4:
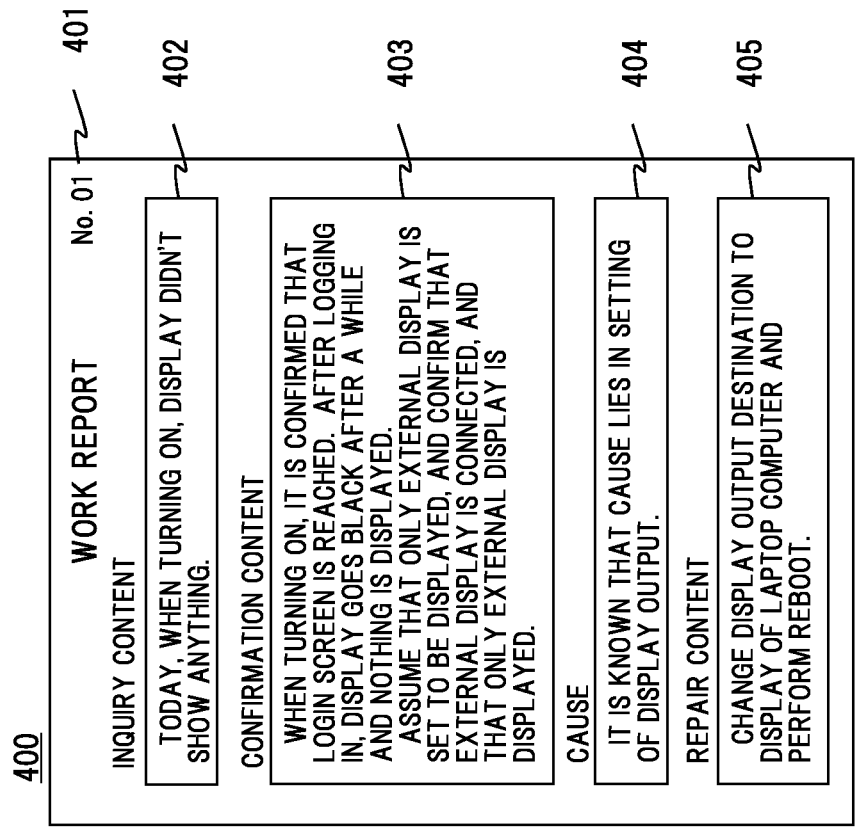
FIG. 4 is a table diagram illustrating an example of contents of a report.

FIG. 4 illustrates an example of the contents of the report. For example, a work report 400 for repairing the display of a certain personal computer is described in the following configuration. An ID or number 401 that identifies the report is written in the work report 400.

An inquiry content 402 indicates the content of the inquiry from the user (referred to as a "general user") of the personal computer. The inquiry content 402 is a fact confirmed by a general user. A confirmation content 403 indicates the fact confirmed by the user (repair staff) who responds to the inquiry from general users. As a premise of confirmation of the fact, since the repair staff determines the necessary confirmation work based on the inquiry content 402, the confirmation content can be defined as a first stage inference based on the inquiry content 402. Since the cause is estimated by the repair staff based on the confirmation content 403, a cause 404 can be defined as a second stage inference. Since the repair staff determines the work for removing the cause based on the cause 404, a repair content 405 can be defined as a third stage inference.

Due to the configuration of the material called the work report, each item is configured according to the logical order, and thus, as illustrated later in FIG. 7A, the nodes are configured for each item, and the nodes are connected by a link. Therefore, it is possible to illustrate the causal relationship of the inference.

The example of the work report 400 in FIG. 4 is an example, and the format of the report is arbitrary. It may have more subdivided items or may be simplified, but as illustrated in FIG. 4, generally, there is itemization for each stage of the inferences, such as the "inquiry content (fact)", the "confirmation content (inference 1)", the "cause (inference 2)", and the "repair content (inference 3)". Even when it is not itemized, the itemization may be automatically performed by parsing or extracting keywords. Alternatively, the operator may perform the itemization and re-input the itemized ones.

In many cases, the reports describe "facts" and "fact-based multi-stage inference" in this manner, and thus, the reports are derived to final conclusions. That is, in many cases, the text of the report contains a premise (fact), a first inference derived from the premise, and a second inference derived on the premise of the first inference.

FIG. 5 is a table diagram illustrating an example of the data configuration of the case DB 105 storing the work report 400 as illustrated in FIG. 4. One of the work reports 400 corresponds to one line. Each line stores the ID or number 401 identifying the work report 400, the inquiry content 402, the confirmation content 403, the cause 404, and the repair content 405. The inquiry content 402, the confirmation content 403, the cause 404, and the repair content 405 may be stored as the text data.

The case DB 105 is input with the data of the work report 400 from the input unit 101 and is stored in the storage device of the repair recommendation system 100. Alternatively, the case DB 105 may be stored in another data server or the like that the repair recommendation system 100 can access.

<3-1. Generation and Implementation of Inference Model>

Returning to FIG. 3, in the process S302, labels are attached to each of the reports. The label will be used later as a reply for the teacher data, and will be a proposal (reply) output with respect to a request (question) from the user 200 when the inference model 103 is in operation.

The labels are attached by skilled repair staffs and other estimation models. At the time of work, for example, the output unit 102 displays the contents of the report to the repair staff, and the repair staff inputs a label by using the input unit 101. The type and definition of the label are arbitrary, but a "cause of failure", a "failure site", a "repair method", a "part for repair", and the like are exemplified. For example, in the example of the report "No. 01" of FIG. 5, referring to the repair content 405 of the work report 400, the "display output destination" is labeled as the "failure site", and the "change of the output destination" is labeled as the "repair method". Alternatively, referring to the cause 404 of the work report 400, the "setting of the display output" is labeled as the "cause of failure".

In the process S303, the teacher DB 106 for learning the inference model 103 is generated. As the teacher data stored in the teacher DB 106, the above-mentioned label is used as the reply. As a question, in the case of a repair recommendation system, the facts are preferably used. For example, in FIGS. 4 and 5, at least one of the inquiry content 402 which is a fact confirmed by the user and the confirmation content 403 which is a fact confirmed by the repair staff is used.

FIG. 6A is a table diagram illustrating an example of the data configuration of the teacher DB 106 using the work report 400 illustrated in FIG. 4. One of the work reports 400 corresponds to one line. The ID or the number 601 identifying the work report 400, the text of the inquiry content 402 and the confirmation content 403 of the work report 400 as a question 602, and the "failure site" and the "repair method" as a label 603 are stored in each line.

FIG. 6B is a table diagram illustrating another example of the data configuration of the teacher DB 106 using the work report 400 illustrated in FIG. 4. The text of the inquiry content 402 is stored as the question 602, and the "cause of failure" is stored as the label 603.

FIG. 6C is a table diagram illustrating another example of the data configuration of the teacher DB 106 using the work report 400 illustrated in FIG. 4. The text of the inquiry content 402 is stored as the question 602, and the "failure site" and the "repair method" are stored as the label 603.

Returning to FIG. 3, in the process S304, the vectorization unit 108 vectorizes the text data of the question 602 of the teacher DB 106. With respect to the vectorization of the text, a known method may be used, and thus, the detailed description will be omitted.

In the process S305, the model learning unit 107 performs teacher-presence learning of the inference model 103 by using the teacher data of the teacher DB 106. As the inference model 103, a DNN or other model may be used, and the inference model 103 is not particularly limited. Various methods can be used as a method of the teacher-presence learning, and there is no particular limitation. In the learning, the inference model 103 is usually learned by applying a plurality of the teacher data sets in which the question 602 of the teacher DB 106 is set as the question and the label 603 is set as the reply.

In the process S306, the inference model 103 for which learning has been completed is implemented in the repair recommendation system 100. The inference model 103 may be hardware such as FPGA or software. The appropriately learned inference model 103 can perform an appropriate proposal (reply) with respect to a request (question) from the maintenance staff 200.

<3-2. Information for Users to Obtain a Sense of Conviction from Result of Inference Model>

Before describing the inference network 104, which is one of the features of the embodiment, the significance of the information for the user to obtain a sense of conviction from the inference result of the inference model will be described.

For example, the inference model 103 learned by using the teacher data in FIG. 6C obtains the labels of the "repair site" and the "repair method" extracted from the repair content 405 as an output by using the inquiry content 402 of the work report 400 as an input. The appropriately learned inference model 103 may be able to output the appropriate label (reply). However, considering the input/output of the inference model, it can be viewed that the confirmation content 403 and the cause 404 are missing among the inquiry content 402, the confirmation content 403, the cause 404, and the repair content 405 which are the items of the work report 400.

That is, from the viewpoint of the user, a portion of a chain of the inference configured with the "inquiry content 402", the "confirmation content 403", the "cause 404", and the "repair content 405" is missing. The inventors considered that, by presenting the portion of the inference missing from the input/output of the inference model 103 to the user, the user can obtain a sense of conviction from the inference result of the inference model. The inference network 104 provides units for this.

<3-3. Generation and Implementation of Inference Network>

Returning to FIG. 3, in the process S307, the vectorization unit 108 vectorizes the text data of the inquiry content 402, the confirmation content 403, the cause 404, and the repair content 405 of the case DB 105.

In the process S308, the grouping unit 110 groups the vectorized texts for each of the inquiry content 402, the confirmation content 403, the cause 404, and the repair content 405. A known method may be adopted for the grouping. Generally, a clustering method of grouping texts having similar vector values is known. The size of the group is arbitrary, but if the group is subdivided, the inference network 104 will become complicated and difficult to handle, but if the group is too large, noise will increase in the later search results, so that the group is adjusted to an appropriate size.

In the process S309, the text having the vector value closest to the average value of the vector values in each group is extracted as the representative text. Due to representing of a group with a representative text, the user can easily understand the configuration of the inference network 104. However, the generation of the representative text may be omitted. When the representative text is omitted, the texts contained in each group may be referenced to sequentially.

In the process S310, the items of each report are networked. The inquiry content 402, the confirmation content 403, the cause 404, and the repair content 405 which are the items of each report are set as the nodes.

As illustrated in FIG. 7A, the node is configured with each item of the inquiry content 402, the confirmation content 403, the cause 404, and the repair content 405 of the same work report 400, and the nodes are connected by links 700. In the example of FIG. 7A, there are 100 reports from 1 to 100, and each report contains multi-stage inference of A, B, C, and D. For example, A corresponds to the inquiry content 402, B corresponds to the confirmation content 403, C corresponds to the cause 404, and D corresponds to the repair content 405. Herein, the inquiry content of Report 1 is denoted by a symbol such as "1A", and the repair content of Report 3 is denoted by a symbol such as "3D". Then, the nodes belonging to the same group grouped by the grouping unit 110 are combined into one.

FIG. 7B is a conceptual diagram illustrating a concept in which the nodes of FIG. 7A are grouped and networked. The repair contents "3D" and "4D" of reports 3 and 4 are grouped in one group 701. The causes "1C", "2C", and "3C" of Reports 1, 2, and 3 are grouped in one group 702. The cause "4C" of Report 4 alone constitutes a group 703.

At this time, since the items of the same Report 4 are included in the groups 701 and 703, an intergroup link 704 is formed. Further, since the items of the same Report 3 are included in the groups 701 and 702, an intergroup link 705 is formed. In this manner, the inference network 104 is generated.

In addition, in order to avoid complication of the inference network 104, a group having a size smaller than a predetermined value and an intergroup link connected to the group may be deleted. For example, a group containing only two or less nodes is set to be deleted, and the group 703 containing only "4C" and the intergroup link 704 are deleted.

Alternatively, the intergroup links may be deleted between the groups connected by a predetermined number or less of links. For example, the intergroup link 705 between the group 701 and the group 702 which are connected only by a link 707 is deleted.

In this manner, by setting an appropriate threshold value and simplifying a portion of the inference network 104, the user can easily understand the inference network 104.

FIG. 8 is a diagram illustrating a concept of the inference network 104 networked by the grouping. A layer A corresponds to the inquiry content 402, a layer B corresponds to the confirmation content 403, a layer C corresponds to the cause 404, a layer D corresponds to the repair content 405, and thus, the inference network is configured with four layers. When the number of layers is two or more, it may be changed according to the field or item of the underlying work report 400.

It is noted that, in the inference network 104, the nodes illustrated by circles in the figure are the grouped nodes illustrated in FIG. 7B. That is, one node of the inference network 104 contains one or a plurality of items of the work report 400. The node in the highest level (herein, A) is the input node, and the node in the lowest level (herein, D) is the output node.

One node is a collection of similar items from one or a plurality of reports. From each node, a link is formed to the node to which the same report item as the item belonging to the node belongs.

FIG. 9 is an example of network data 900 that defines the configuration of the inference network 104. With respect to a group ID 901 uniquely identifying the group, a report number 902 of nodes belonging to the group and a link destination group ID 903 of the group connected to the group by the intergroup link are stored. In addition, a representative text 904 representing the group may be stored.

<4. Recommendation by Repair Recommendation System>

Figure 10:
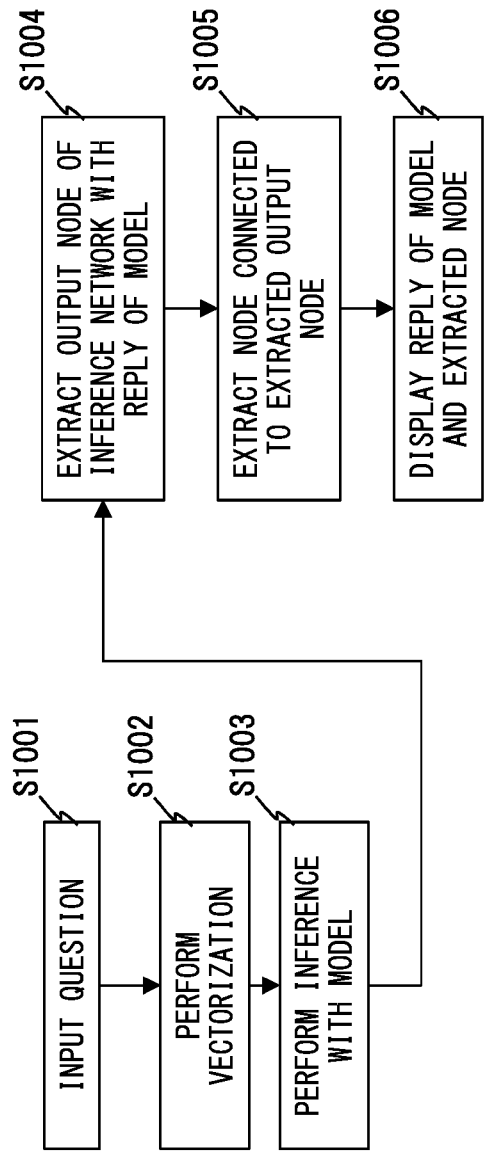
FIG. 10 is a flowchart illustrating a flow of a repair recommendation process.

FIG. 10 is a diagram illustrating a flow of a repair recommendation process by the repair recommendation system 100.

In the process S1001, the input unit 101 acquires the question that is the input to the inference model 103. The question is, for example, text data of a question statement transmitted by the user 200 via the terminal device 300. Other methods such as voice-recognizing a voice input and converting into text may be used.

In the process S1002, the text of the question statement is vectorized by the vectorization unit 108.

In the process S1003, the vectorized question is input to the inference model 103 and the inference is performed. The reply of the inference model 103 is obtained in a form of the label 603.

In the process S1004, the network search unit 113 searches for the output node of the inference network 104 by the obtained label 603. As illustrated in FIG. 3, when the inference network is generated from the case data with the label attached, since the label corresponds to the output node of the inference network 104, the label of the output node may be searched for by the label of the reply. Alternatively, the text of the report item that is the source of the label may be searched for by using the label as a keyword.

In a case where the group of reports constituting the output node contains the contents of the plurality of reports, when the label of one of the reports is hit, the group is extracted. Alternatively, when the labels of a predetermined rate or more of the reports are hit, the group may be extracted. Alternatively, when the label of the report provided with the representative text is hit, the group may be extracted.

In the process S1005, the network search unit 113 extracts the node directly or indirectly connected to the extracted output node.

In the process S1006, the output unit 102 outputs the reply and the extracted node of the inference model 103. The output unit 102 transmits the information of the reply of the inference model 103 and the extracted node to, for example, the terminal device 300 and displays the information on the display thereof.

FIG. 11A is an example of the replies and the extracted nodes of the inference model 103 displayed on the display of the terminal device 300. The data configuration is set to the examples illustrated in FIGS. 4, 5, 8 and 9, and the input/output of the inference model 103 is set to the input/output illustrated in FIG. 6C. That is, the question to the inference model 103 is the inquiry content 402 in FIGS. 4 and 5, and the reply is the label 603 corresponding to the repair content 405.

In the displayed network 1100, an input node 1101 corresponds to the question 602 (the inquiry contents 402 in FIGS. 4 and 5) illustrated in FIG. 6C. An output node 1102 corresponds to the label 603 illustrated in FIG. 6C (and the repair content 405 of FIGS. 4 and 5 corresponding to the label). Since the label corresponds to the repair content 405, the "display output destination" is displayed as "repair site", and "change of the output destination" as the "repair method" is displayed as a reply 1103. The nodes (indicated by circles in the drawings) directly or indirectly connected to the output node 1102 are illustrated in the network 1100.

Generally, in the recommendation by the inference model 103, the reply 1103 is illustrated. Further, since the user 200 can know the input to the inference model 103, the user can recognize that there is a high probability that any of the input nodes correspond to the inquiry content 402.

However, in some cases, the user 200 may not be convinced of the recommendation according to only the indicated reply 1103, and thus, the user may hesitate to make a decision. Therefore, in the embodiment, the proceeding of the inference derived to the reply 1103 (node illustrated by the diagonal line in FIG. 11A) is visualized by using inference network 104, so as to provide the information that the user 200 can be convinced of the recommendation.

Specifically, for example, the network 1100 as illustrated in FIG. 11A is displayed on the display of the terminal device 300. The output node 1102 corresponds to the reply 1103 of the inference model 103, and the node connected to this reply is extracted and illustrated from the inference network 104.

As illustrated in FIG. 11B, when the user 200 viewing the reply 1103 desires to know the basis of the reply, the user designates an intermediate node 1104 connected to, for example, the output node 1102. The designated intermediate node 1104 corresponds to the item of the cause 404 in the data configuration of the case DB 105 (FIG. 5). The network search unit 113 extracts the representative text 904 corresponding to the group ID 901 of the designated intermediate node in the network data 900. The representative text 904 is displayed as a cause comment 1105 by the output unit 102.

When the user 200 is convinced of the presented cause comment 1105, the work can be started according to the reply 1103. Alternatively, when the user 200 is not convinced of the presented cause, the user can know the basis of the cause comment 1105 from the network 1100 by further following the link.

As illustrated in FIG. 11C, the user 200 viewing views the cause comment 1105 of the intermediate node 1104 designates an intermediate node 1106 connected to the intermediate node 1104 when the user desires to know the basis further. The designated intermediate node 1106 corresponds to the item of confirmation content 403 in the data configuration of the case DB 105 (FIG. 5). The network search unit 113 extracts the representative text 904 corresponding to the group ID 901 of the designated intermediate node in the network data 900. The representative text 904 is displayed as a confirmation content comment 1107 by the output unit 102.

In this example, the confirmation content 403 indicates the fact confirmed by the repair staff who responds to the inquiry from the general user. Therefore, when the user (repair staff) 200 finds the content matching the confirmation content of the confirmation performed by the user in the confirmation content comment 1107, it is considered that it is easy to be convinced of the cause comment 1105 of the intermediate node 1104.

For example, in the example of FIG. 11C, with respect to the cause of "display output setting", when the user (repair staff) has confirmed the related phenomenon of "after logging in, the display goes black for a while and nothing is displayed", it is considered that the user is likely to be convinced of the cause comment 1105. When the user 200 is convinced of the presented content, the user can start the work according to the reply 1103. Alternatively, when the user 200 is not convinced of the presented content, the user can know the basis of the cause comment 1105 from the case data by following another link.

As illustrated in FIG. 11D, when the user 200 who views the confirmation content comment 1107 of the intermediate node 1104 desires to search for further basis, the user designates another intermediate node 1108 connected to the intermediate node 1104. The designated intermediate node 1106 corresponds to the confirmation content 403 of another report in the data configuration of the case DB 105 (FIG. 5). The network search unit 113 extracts the representative text 904 corresponding to the group ID 901 of the designated intermediate node in the network data 900. The representative text 904 is displayed as a confirmation content comment 1109 by the output unit 102.

The user 200 views the confirmation content comment 1109, and when the confirmation content is confirmed, the user 200 performs a confirmation operation. When the result of the confirmation work matches the confirmation content comment 1109, the basis of the cause comment 105 is obtained from another viewpoint, and a sense of conviction can be reinforced.

For example, in the example of FIG. 11D, with respect to the cause of "display output setting", when the user (repair staff) 200 has confirmed the related phenomenon of "nothing is displayed even if the display is reconnected to a new display", it is considered that the user is more likely to be convinced of the cause comment 1105.

In FIGS. 11A to 11D, the link is traced back to the intermediate nodes 1106 and 1108 in the hierarchy of the confirmation contents, but it is also effective to confirm the inquiry contents back to the input node 1101. Further, although the usage example of tracing back the link of the inference network 104 is illustrated, for example, after the link can be traced back to the input node 1101 or the intermediate nodes 1106 and 1108 of the hierarchy of the confirmation content, the link can be lowered in the direction of the hierarchy of the cause. By confirming the contents of the nodes connected by the link, useful information for making a decision can be obtained.

It is noted that, in FIGS. 11A to 11D, the label or the representative text among the texts of the reports belonging to each node is displayed. Further, in order to know the detailed information of the node, the illustration of not only the label and the representative text but also the contents of the report as illustrated in FIG. 5 is useful for the user 200 to make a decision. For that reason, the text data of the corresponding report may be extracted by using the report number 902 of the network data 900 of FIG. 9 and referring to the report number 401 of the case DB 105 of FIG. 5.

In the above-described embodiment, the repair recommendations are exemplified, application to other fields such as software debugging can be used. In the above-described embodiment, the inference network 104 has four layers, and each layer corresponds to the item of the work report 400 and has the inquiry content 402, the confirmation content 403, the cause 404, and the repair content 405. However, the number or contents of the layer may be able to be according to the field of application.

According to the embodiment, not only the inference result of the inference model 103 but also the proceeding of the stepwise inference being derived to the inference result can be presented to the user, so that the information for the user to obtain a sense of conviction can be quickly extracted. By using the inference network 104, the useful information with less noise can be obtained than the searching for the case DB 105 directly with the label of the reply or the like. For example, when the entire case DB 105 is searched for by simply using the keywords "display output destination" and "changing of output destination" in the examples of FIGS. 11A to 11D, an irrelevant inquiry content of "when setting to change the display output destination is performed, the size of the displayed screen is to be changed, but the size cannot be restored" in FIG. 5 is extracted.

In this manner, in the embodiment, for example, it is possible to configure the "inquiry content" so as not to be extracted only by the same word appearing in the "inquiry content" as the word appearing in the "cause". As a result, there is an effect that the items and the reports containing information truly desired by the user which are linked by the causal relationship of the inference can be quickly obtained. In this manner, in the embodiment, it is possible to reduce the noise in the searching.

Second Embodiment

In the first embodiment, the teacher data of the inference model 103 and the inference network 104 are generated with the same case data. However, it is not necessary to use the entirely same data, and only a portion of the same data may be used. Further, even if the case data is not the same as the teacher data, as long as the case data is in the same or similar field, the case data can be used to generate the inference network 104.

Figure 12:
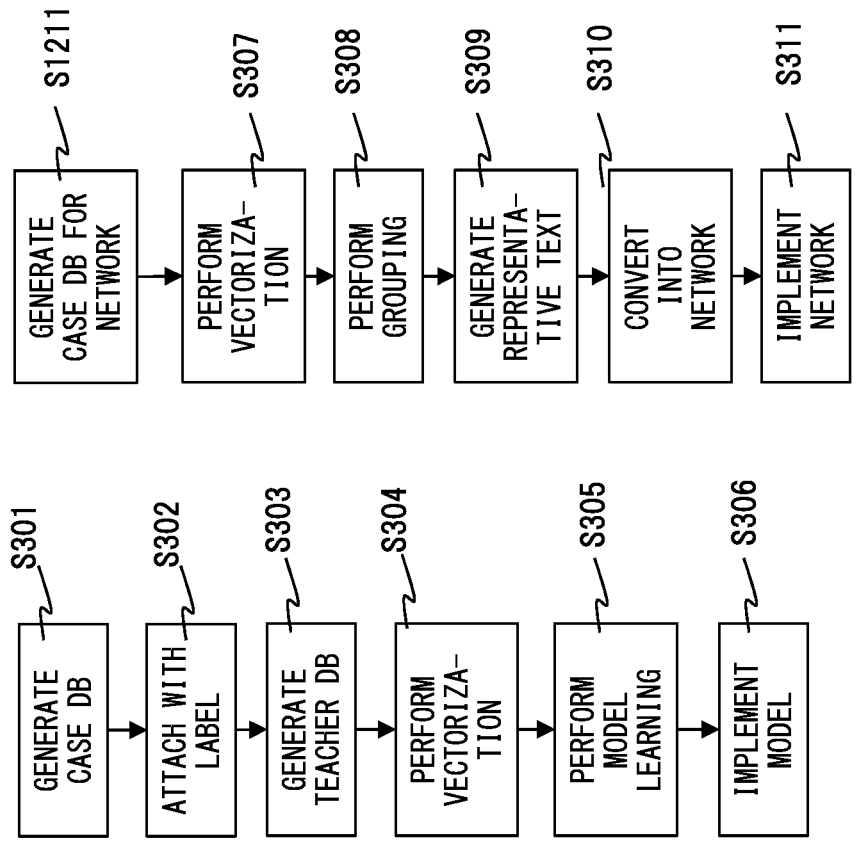
FIG. 12 is a flowchart illustrating a process of generating and implementing an inference model and an inference network according to a second embodiment.

FIG. 12 illustrates an example in which the case DB 1211 for the network is prepared and the inference network 104 is generated with the data which is different from the case data used for generating the teacher data.

The flow of the repair recommendation process may be the same as that illustrated in FIG. 10. However, when the network case DB 1211 is used, a label for the teacher data is not attached to the inference network 104. Therefore, in the process S1004 of extracting the output node from the inference network, the text of the item of the output node of the inference network 104 is directly searched for by the label of the reply of the inference model 103. Alternatively, both of the text that is the source of the label of the reply of the inference model 103 and the text of the output node of the inference network 104 are vectorized and searched for the comparison.

Third Embodiment

In the first embodiment, the output node of the inference network 104 is extracted, and the node connected to the output node is extracted with the label of the reply of the inference model 103. However, since the user 200 can also know the question of the inference model 103, the input node of the inference network 104 may be extracted by the question of the inference model 103.

FIG. 13 illustrates the flow of the repair recommendation process of third embodiment. In comparison with the flow of FIG. 10, the process S1301 of extracting the input node of the inference network 104 by inputting the model is added. In the process S1301, the text of question of the inference model 103 may be vectorized, the representative text of input node of the inference network 104 may be vectorized, and both may be compared for the extraction of a similar text.

The display in this case is enabled by clearly indicating the corresponding input node 1101 and the corresponding output node 1102, for example, as illustrated in FIG. 11A. Alternatively, only the node between the corresponding input node and the corresponding output node may be displayed. In comparison with the first embodiment, there is an effect that the related nodes are reduced and become cheap.

REFERENCE SIGNS LIST

100 Repair recommendation system
200 User (repair staff)
300 Terminal device
101 Input unit
102 Output unit
103 Inference model
104 Inference network
105 Case DB
106 Teacher DB
107 Model learning unit
108 Vectorization unit
109 Teacher data generation unit
110 Grouping unit
111 Representative text generation unit
112 Network generation unit
113 Network search unit

The invention claimed is:

1. A recommendation system comprising:
an inference model;
an input unit inputting a question of the inference model;
an output unit outputting a reply of the inference model;
an inference network having an input node and an output node and expressing an inference stage with a link; and
a processor which when executing a program configures the processor to search for the output node of the inference network based on the reply of the inference model and extract a node directly or indirectly connected to the searched output node based on the reply of the inference model,
wherein the inference network is a network with at least three layers and has a layer of an intermediate node between the input node and the output node,
wherein each layer of the inference network corresponds to each of items of an itemized text,
wherein a node of the inference network is generated by grouping texts having similar contents in each of the items,
wherein the output unit outputs information for displaying a reply of the inference model, the searched output node, and the node directly or indirectly connected to the output node, and
wherein when the node directly or indirectly connected to the output node is selected by a user, the output unit outputs the detailed information of the node directly or indirectly connected to the output node.

2. The recommendation system according to claim 1, wherein the itemized text includes a portion of a text used to generate teacher data used for learning the inference model.

3. The recommendation system according to claim 1, wherein the items of the itemized text include at least a premise, a first inference derived from the premise, and a second inference derived on the premise of the first inference.

4. The recommendation system according to claim 3,
wherein the itemized text is a work report, and
wherein the premise is a comment about a state of a product by a user of the product, the first inference is a comment about the state of the product by a maintenance work person of the product, and the second inference is a comment about a cause of a failure of the product or repair of the failure.

5. The recommendation system according to claim 1, wherein the processor is further configured to search for the input node of the inference network based on the input to the inference model.

* * * * *